US009239848B2

(12) United States Patent
Liu et al.

(10) Patent No.: US 9,239,848 B2
(45) Date of Patent: Jan. 19, 2016

(54) SYSTEM AND METHOD FOR SEMANTICALLY ANNOTATING IMAGES

(75) Inventors: Ce Liu, Arlington, MA (US); Michael Rubinstein, Somerville, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 590 days.

(21) Appl. No.: 13/367,139

(22) Filed: Feb. 6, 2012

(65) Prior Publication Data

US 2013/0202205 A1 Aug. 8, 2013

(51) Int. Cl.
*G06F 17/30* (2006.01)

(52) U.S. Cl.
CPC .... *G06F 17/30247* (2013.01); *G06F 17/30268* (2013.01)

(58) Field of Classification Search
None
See application file for complete search history.

(56) References Cited

U.S. PATENT DOCUMENTS

| 5,852,823 | A | 12/1998 | De Bonet |
| 5,893,095 | A | 4/1999 | Jain et al. |
| 5,913,205 | A | 6/1999 | Jain et al. |
| 6,128,446 | A | 10/2000 | Schrock et al. |
| 6,397,213 | B1 | 5/2002 | Cullen et al. |
| 6,480,841 | B1 | 11/2002 | Higashio et al. |
| 6,584,223 | B1 * | 6/2003 | Shiiyama ...................... 382/173 |
| 6,804,659 | B1 | 10/2004 | Graham et al. |
| 6,804,684 | B2 | 10/2004 | Stubler et al. |
| 6,970,860 | B1 | 11/2005 | Liu et al. |
| 7,010,751 | B2 | 3/2006 | Shneiderman |
| 7,403,642 | B2 | 7/2008 | Zhang et al. |
| 7,624,337 | B2 | 11/2009 | Sull et al. |
| 7,739,304 | B2 | 6/2010 | Naaman et al. |
| 7,890,512 | B2 | 2/2011 | Mei et al. |
| 7,961,986 | B1 | 6/2011 | Jing et al. |
| 7,971,150 | B2 | 6/2011 | Raskutti et al. |
| 8,341,112 | B2 | 12/2012 | Zhang et al. |
| 2002/0038299 | A1 | 3/2002 | Zernik et al. |

(Continued)

FOREIGN PATENT DOCUMENTS

| CN | 1920820 | 2/2007 |
| CN | 103268317 A | 8/2013 |

(Continued)

OTHER PUBLICATIONS

"International Search Report", Mailed Date: May 16, 2013, Application No. PCT/US2013/023352, Filed Date: Jan. 28, 2013, pp. 9.

(Continued)

*Primary Examiner* — Bernard Krasnic
(74) *Attorney, Agent, or Firm* — Alin Corie; Sandy Swain; Micky Minhas

(57) ABSTRACT

Techniques for semantically annotating images in a plurality of images, each image in the plurality of images comprising at least one image region. The techniques include identifying at least two similar images including a first image and a second image, identifying corresponding image regions in the first image and the second image, and assigning, using at least one processor, annotations to image regions in one or more images in the plurality of images by using a metric of fit indicative of a degree of match between the assigned annotations and the corresponding image regions. The metric of fit may depend on at least one annotation for each image in a subset of the plurality of images and the identified correspondence between image regions in the first image and the second image.

20 Claims, 5 Drawing Sheets

(56) References Cited

U.S. PATENT DOCUMENTS

| | | | |
|---|---|---|---|
| 2002/0087538 | A1 | 7/2002 | Abdel-Mottaleb et al. |
| 2002/0184196 | A1 | 12/2002 | Lehmeier et al. |
| 2002/0188602 | A1 | 12/2002 | Stubler et al. |
| 2003/0018631 | A1 | 1/2003 | Lipson et al. |
| 2003/0195883 | A1 | 10/2003 | Mojsilovic et al. |
| 2004/0003351 | A1 | 1/2004 | Sommerer et al. |
| 2004/0021780 | A1 | 2/2004 | Kogan |
| 2004/0070678 | A1 | 4/2004 | Toyama et al. |
| 2004/0213553 | A1 | 10/2004 | Nagahashi |
| 2004/0225686 | A1 | 11/2004 | Li et al. |
| 2004/0264780 | A1 | 12/2004 | Zhang et al. |
| 2005/0010602 | A1 | 1/2005 | Loui et al. |
| 2005/0060308 | A1* | 3/2005 | Naphade et al. ............ 707/5 |
| 2005/0114325 | A1 | 5/2005 | Liu et al. |
| 2005/0210393 | A1 | 9/2005 | Maeng |
| 2005/0278379 | A1 | 12/2005 | Nakazawa |
| 2006/0143176 | A1 | 6/2006 | Mojsilovic et al. |
| 2006/0179453 | A1 | 8/2006 | Kadie et al. |
| 2006/0264209 | A1 | 11/2006 | Atkinson et al. |
| 2007/0005571 | A1 | 1/2007 | Brewer et al. |
| 2007/0038601 | A1 | 2/2007 | Guha |
| 2007/0106685 | A1 | 5/2007 | Houh et al. |
| 2007/0110338 | A1* | 5/2007 | Snavely et al. ............ 382/305 |
| 2007/0112844 | A1 | 5/2007 | Tribble et al. |
| 2007/0160275 | A1 | 7/2007 | Sathyanarayana |
| 2007/0240060 | A1 | 10/2007 | Berenbach et al. |
| 2007/0255618 | A1 | 11/2007 | Meerbergen et al. |
| 2007/0266001 | A1 | 11/2007 | Williams et al. |
| 2007/0271226 | A1 | 11/2007 | Zhang et al. |
| 2007/0288453 | A1 | 12/2007 | Podilchuk |
| 2008/0004953 | A1 | 1/2008 | Ma et al. |
| 2008/0235724 | A1 | 9/2008 | Sassenscheidt et al. |
| 2008/0319844 | A1 | 12/2008 | Hua et al. |
| 2009/0187825 | A1 | 7/2009 | Sandquist et al. |
| 2009/0196510 | A1 | 8/2009 | Gokturk et al. |
| 2009/0249185 | A1 | 10/2009 | Datar et al. |
| 2009/0289942 | A1 | 11/2009 | Bailloeul et al. |
| 2009/0297050 | A1* | 12/2009 | Li et al. ............ 382/225 |
| 2009/0300475 | A1 | 12/2009 | Fink et al. |
| 2009/0313239 | A1 | 12/2009 | Wen et al. |
| 2009/0313294 | A1* | 12/2009 | Mei et al. ............ 707/103 R |
| 2009/0319883 | A1 | 12/2009 | Mei et al. |
| 2010/0008547 | A1 | 1/2010 | Yagnik et al. |
| 2010/0057694 | A1 | 3/2010 | Kunjithapatham et al. |
| 2010/0076923 | A1 | 3/2010 | Hua et al. |
| 2010/0076968 | A1 | 3/2010 | Boyns et al. |
| 2010/0114888 | A1 | 5/2010 | Van Zwol et al. |
| 2010/0205202 | A1 | 8/2010 | Yang et al. |
| 2010/0226582 | A1* | 9/2010 | Luo et al. ............ 382/224 |
| 2010/0239123 | A1 | 9/2010 | Funayama et al. |
| 2010/0293174 | A1 | 11/2010 | Bennett et al. |
| 2011/0173141 | A1 | 7/2011 | Campbell et al. |
| 2012/0166175 | A1* | 6/2012 | Kopparapu ............ 704/3 |

FOREIGN PATENT DOCUMENTS

| | | |
|---|---|---|
| EP | 1304625 A2 | 4/2003 |
| JP | H11-96176 A | 4/1999 |
| JP | 2003-186889 A | 7/2003 |
| JP | 2004-234228 A | 8/2004 |
| JP | 2005-011079 A | 1/2005 |
| JP | 2005-352782 A | 12/2005 |
| KR | 10-2004-0054901 A | 6/2004 |
| KR | 10-2011-0054203 A | 5/2011 |
| RU | 2193797 C2 | 11/2002 |
| WO | 2005/008519 A1 | 1/2005 |
| WO | 2006/002745 A1 | 1/2006 |
| WO | 2013/119400 A1 | 8/2013 |

OTHER PUBLICATIONS

Li, et al., "SIFT Flow: Dense Correspondence across Scenes and Its Applications", In Proceedings of IEEE Transactions on Pattern Analysis And Machine Intelligence, vol. 33, Issue No. 5, May 2011, pp. 978-994.

Li, et al., "Automatic Image Annotation Using Maximum Entropy Model", In Proceedings of International Joint Conference on Natural Language Processing, 2005, pp. 34-45.

Mei, et al., "Coherent Image Annotation by Learning Semantic Distance", In Proceedings of IEEE Conference on Computer Vision and Pattern Recognition, Jun. 23-28, 2008, pp. 1-8.

Li, et al., "Searching One Billion Web Images by Content: Challenges and Opportunities", In Proceedings of LNCS 4577, Jun. 30, 2007, pp. 33-36.

"Tagged Media-aware Multimodal Content", Retrieved on: Oct. 20, 2011, Available at: http://mmspg.epfl.ch/page-58367-en.html.

Dorado, et al., "Semantic Labelling Of Images Combining Color, Texture and Keywords", In Proceedings of International Conference on Image Processing, vol. 2, Issue 3, Sep. 14-17, 2003, pp. 9-12.

K. Barnard, P. Duygulu, D. Forsyth, N. De Freitas, D.M. Blei, and M.I. Jordan. Matching words and pictures. The Journal of Machine Learning Research, 3:1107-1135, 2003.

K. Barnard and M. Johnson. Word sense disambiguation with pictures. Artificial Intelligence, 167(1-2):13-30, 2005.

C. Barnes, E. Shechtman, A. Finkelstein, and D.B. Goldman. Patchmatch: a randomized correspondence algorithm for structural image editing. In ACM Transactions on Graphics (TOG), vol. 28, p. 24. ACM, 2009.

D. Batra, A. Kowdle, D. Parikh, J. Luo, and T. Chen. icoseg: Interactive co-segmentation with intelligent scribble guidance. In Computer Vision and Pattern Recognition (CVPR), 2010 IEEE Conference on, pp. 3169-3176. IEEE, 2010.

N. Chinchor and B. Sundheim. Muc-5 evaluation metrics. In Proceedings of the 5th conference on Message understanding, pp. 69-78. Association for Computational Linguistics, 1993.

N. Dalal and B. Triggs. Histograms of oriented gradients for human detection. 2005.

Y. Jing and S. Baluja. Visualrank: Applying pagerank to large-scale image search. IEEE Transactions on Pattern Analysis and Machine Intelligence, pp. 1877-1890, 2008.

C. Liu, J. Yuen, and A. Torralba. Nonparametric scene parsing: Label transfer via dense scene alignment. 2009.

C. Liu, J. Yuen, A. Torralba, J. Sivic, and W.T. Freeman. Sift flow: dense correspondence across different scenes. In Proceedings of the 10th European Conference on Computer Vision: Part III, pp. 28-42. Springer-Verlag, 2008.

D.G. Lowe. Distinctive image features from scale-invariant keypoints. International journal of computer vision, 60(2):91-110, 2004.

A. Makadia, V. Pavlovic, and S. Kumar. A new baseline for image annotation. In ECCV, vol. 8, pp. 316-329. Citeseer, 2008.

A. Oliva and A. Torralba. Modeling the shape of the scene: A holistic representation of the spatial envelope. International Journal of Computer Vision, 42(3):145-175, 2001.

N. Pinto, Y. Barhomi, D.D. Cox, and J.J. DiCarlo. Comparing state-of-the-art visual features on invariant object recognition tasks. In Applications of Computer Vision (WACV), 2011 IEEE Workshop on, pp. 463-470. IEEE, 2011.

C. Rother, V. Kolmogorov, and A. Blake. Grabcut: Interactive foreground extraction using iterated graph cuts. In ACM Transactions on Graphics (TOG), vol. 23, pp. 309-314. ACM, 2004.

B.C. Russell, A. Torralba, K.P. Murphy, and W.T. Freeman. Labelme: a database and web-based tool for image annotation. International Journal of Computer Vision, 77(1):157-173, 2008.

Burr Settles. Active learning literature survey, 2010. Computer Sciences Technical Report 1648, University of Wisconsin Madison.

J. Shotton, J. Winn, C. Rother, and A. Criminisi. Textonboost: Joint appearance, shape and context modeling for multi-class object recognition and segmentation. Computer Vision—ECCV 2006, pp. 1-15, 2006.

J.M. Siskind. Learning word-to-meaning mappings. 1997.

J. Sivic, B.C. Russell, A.A. Efros, A. Zisserman, and W.T. Freeman. Discovering objects and their location in images. In Computer Vision, 2005. ICCV 2005. Tenth IEEE International Conference on, vol. 1, pp. 370-377. IEEE, 2005.

E. Sudderth and M.I. Jordan. Shared segmentation of natural scenes using dependent pitman-yor processes. Advances in Neural Information Processing Systems, 21, 2009.

(56) References Cited

OTHER PUBLICATIONS

Sara Vicente, Carsten Rother, and Vladimir Kolmogorov. Object cosegmentation. In Computer Vision and Pattern Recognition (CVPR), 2011 IEEE Conference on. IEEE, 2011.
S. Vijayanarasimhan and K. Grauman. Cost-sensitive active visual category learning. International Journal of Computer Vision, pp. 1-21, 2011.
X.J. Wang, L. Zhang, M. Liu, Y. Li, and W.Y. Ma. Arista-image search to annotation on billions of web photos. In Computer Vision and Pattern Recognition (CVPR), 2010 IEEE Conference on, pp. 2987-2994. IEEE.
J. Xiao, J. Hays, K.A. Ehinger, A. Oliva, and A. Torralba. Sun database: Large-scale scene recognition from abbey to zoo. In Computer vision and pattern recognition (CVPR), 2010 IEEE conference on, pp. 3485-3492. IEEE, 2010.
Hua, et al., "When Multimedia Advertising Meets the New Internet Era", In IEEE 10th Workshop on Multimedia Signal Processing, Oct. 10, 2008, 5 Pages.
Jaspers, et al., "CANDELA—Storage, Analysis and Retrieval of Video Content in Distributed Systems", In Proceedings of the IEEE International Conference on Multimedia and Expo, Jul. 6, 2005, 14 Pages.
Jing, et al., "Learning Region Weighting from Relevance Feedback in Image Retrieval", In Proceedings of the IEEE International Conference on Acoustics Speech and Signal Processing, vol. 4, May 2002, 4 Pages.
Joshi, et al. "Keyword Generation for Search Engine Advertising", In Proceedings of the of the Sixth IEEE International Conference on Data Mining Workshops, Dec. 18, 2006, 24 Pages.
Ke, et al., "PCA-SIFT: A More Distinctive Representation for Local Image Descriptors", In Proceedings of the IEEE Computer Society, Conference on Computer Vision and Pattern Recognition, vol. 2, Jun. 27, 2004, 8 Pages.
Kim, et al., "Learning Implicit User Interest Hierarchy for Context in Personalization", In Proceedings of the 8th International Conference on Intelligent User Interfaces, Jan. 2003, pp. 101-108.
Lacerda, et al., "Learning to Advertise", In Proceedings of the 29th Annual International ACM SIGIR Conference on Research and Development in Information Retrieval, Aug. 11, 2006, pp. 549-556.
Lieberman, Henry, "Letizia: An Agent that Assists Web Browsing", In Proceedings of the International Joint Conference on Artificial Intelligence, Aug. 1995, 6 Pages.
Lli, et al., "Delivering Online Advertisements Inside Images", In Proceedings of the 16th ACM International Conference on Multimedia, Oct. 31, 2008, 10 Pages.
Li, et al., "Image Annotation by Large-Scale Content-based Image Retrieval", In Proceedings of the 14th Annual International Conference on Multimedia, Oct. 27, 2006, pp. 607-610.
Li, et al., "Tag-Based Social Interest Discovery", In Proceedings of the 17th International Conference on World Wide Web, Apr. 25, 2008, 10 Pages.
Lin, et al., "Video Collaborative Annotation Forum: Establishing Ground-Truth Labels on Large Multimedia Datasets", In Proceedings of the TRECVID Workshop, Nov. 2003, 19 Pages.
Ma, et al., "Interest-Based Personalized Search", In ACM Transactions on Information Systems, vol. 25, Issue 1, Feb. 2007, 38 Pages.
Middleton, et al., "Capturing Knowledge of User Preferences: Ontologies in Recommender Systems", In Proceedings of the 1st International Conference on Knowledge Capture, Oct. 2001, 8 Pages.
Moxley, et al., "Automatic Video Annotation through Search and Mining", In IEEE International Conference on Multimedia and Expo, Jun. 23, 2008, pp. 685-688.
Murdock, et al., "A Noisy-Channel Approach to Contextual Advertising", In Proceedings of the 1st International Workshop on Data Mining and Audience Intelligence for Advertising, Aug. 12, 2007, pp. 21-27.
"ODP—The Open Directory Project", Retrieved on: Apr. 16, 2010, Available at: http://www.dmoz.org/.

Plangprasopchok, et al., "Constructing Folksonomies from User-Specified Relations on Flickr", In Proceedings of the 18th International Conference on World Wide Web, Apr. 24, 2009, 10 Pages.
Ribeiro-Neto, et al., "Impedance Coupling in Content-targeted Advertising", In Proceedings of the 28th Annual International ACM SIGIR Conference on Research and Development in Information Retrieval, Aug. 19, 2005, 8 Pages.
Torralba, et al., "80 Million Tiny Images: A Large Dataset for Non-parametric Object and Scene Recognition", In IEEE Transactions on Pattern Analysis and Machine Intelligence, vol. 30, Issue 11, Nov. 2008, 12 Pages.
Tseng, et al., "Video Summarization and Personalization for Pervasive Mobile Devices", In Electronic Imaging, International Society for Optics and Photonics, Dec. 2001, 12 Pages.
"MobiCon—Integrated Capture, Annotation and Sharing of Video Clips with Mobile Phones", In Proceedings of the 13th Annual ACM International Conference on Multimedia, Nov. 2005, 2 Pages.
Wang, et al., "Advertising Based on Users' Photos", In Proceedings of the IEEE International Conference on Multimedia and Expo, Jun. 2009, pp. 1640-1643.
Wang, et al., "Annotating Images by Mining Image Search Results", In IEEE Transactions on Pattern Analysis and Machine Intelligence, vol. 30, Issue 11, Nov. 2008, 14 Pages.
Wang, et al., "Content-Based Image Annotation Refinement", In IEEE Conference on Computer Vision and Pattern Recognition, Jun. 2007, 8 Pages.
"Keyword Research Tools for SEO", retrieved on: Feb. 22, 2010, Available at: http://www.wordtracker.com.
Yamamota, et al., "iVAS: Web-based Video Annotation System and its Applications", In Proceedings of the 3rd International Semantic Web Conference, Nov. 2004, 4 Pages.
Zhang, et al., "EnjoyPhoto: A Vertical Image Search Engine for Enjoying High-Quality Photos", In Proceedings of the 14th annual ACM International Conference on Multimedia, Oct. 27, 2006, 10 Pages.
Zhou, et al., "Utilizing Search Intent in Topic Ontology-based User Profile for Web Mining", In Proceedings of the IEEE/WIC/ACM International Conference on Web Intelligence, Dec. 2006, 4 Pages.
Batra, et al., "Cutout-Search: Putting a Name to the Picture", In Proceedings of the IEEE Computer Society Conference on Computer Vision and Pattern Recognition Workshops, Jun. 2009, 8 Pages.
"Become an Online Image Detective with Tin Eye (groovyReview)", Retrieved on: Aug. 3, 2010, Available at: http://www.groovypost.com/howto/groovyreview/become-online-image-detective-tineye-review.
"bing.com, Maps", Retrieved on: Dec. 28, 2009, Available at: http://cn.bing.com/ditu/.
Cai, et al., "Hierarchical Clustering of WWW Image Search Results using Visual, Textual and Link Information", In Proceedings of the 12th Annual ACM International Conference on Multimedia, Oct. 16, 2004, 8 Pages.
Chang, et al., "LIBSVM: A Library for Support Vector Machines", In Proceedings of the ACM Transactions on Intelligent Systems and Technology, Apr. 2011, 30 Pages.
"Classification and Retrieval of Images", Published on: Sep. 17, 2010, Available at: http://claret.wikidot.com/.
Deschacht, et al., "Text Analysis for Automatic Image Annotation", In Meeting of the Association for Computational Linguistics, vol. 7, Jun. 2007, 8 Pages.
Fergus, et al., "A Visual Category Filter for Google Images", In Computer Vision—ECCV, Lecture Notes in Computer Science, May 2004, 14 Pages.
"Flickr", Retrieved on: Feb. 4, 2010, Available at: http://www.flickr.com/.
"Google Sets", Retrieved on: Dec. 15, 2008, Available at: http://labs.google.com/sets.
"Google", Retrieved on: Feb. 16, 2011, Available at: www.google.com.
Hua, et al., "Internet Multimedia Search and Mining", Published on: Jan. 27, 2010, Available at: http://research.microsoft.com/en-us/um/people/xshua/imsm/ebook/pdf/16.pdf.

(56) References Cited

OTHER PUBLICATIONS

Jing, et al., "Visual Rank: Applying Page Rank to Large-scale Image Search", In IEEE Transactions on Pattern Analysis and Machine Intelligence, vol. 30, Issue 11, Nov. 2008, pp. 1-14.
"Windows Live Photo and Video Blog", Published on: Sep. 17, 2008, Available at: http://blogs.msdn.com/b/pix/archive/2008/09/17/next-version-of-windows-live.aspx.
Kennedy, et al., "Generating Diverse and Representative Image Search Results for Landmarks", In Proceedings of the 17th International Conference on World Wide Web, Apr. 25, 2008, 10 Pages.
Li, et al., "Automatic Linguistic Indexing of Pictures by a Statistical Modeling Approach", In IEEE Transactions on Pattern Analysis and Machine Intelligence, vol. 25, Issue 9, Sep. 2003, pp. 1075-1088.
Lowe, David G., "Distinctive Image Features from Scale-Invariant Keypoints", In Computer Vision, vol. 60, Issue 2, Nov. 2004, 28 Pages.
Miller, et al., "Introduction to WordNet: An On-line Lexical Database", In Lexicography, vol. 3, Issue 4, 1990, 6 Pages.
Monaghan, et al., "Automating Photo Annotation using Services and Ontologies", In Proceedings of 7th IEEE International Conference on Mobile Data Management, May 2006, 4 Pages.
"NeedleSeek (Open-Domain Semantic Search & Mining)", Retrieved on: Feb. 16, 2011, Available at: http://needleseek.msra.cn.
Noah, et al. "Binding Semantic to a Sketch Based Query Specification Tool", In the International Arab Journal of Information Technology, vol. 6, Issue 2, Apr. 2009, pp. 116-123.
Nowak, et al., "Sampling Strategies for Bag-of-features Image Classification", In Computer Vision—ECCV, May 2006, pp. 490-503.
Osman, et al., "Semantic Annotation and Retrieval of Image Collections", In the proceedings of the 21st European Conference on Modelling and Simulation, Jun. 2007, 6 Pages.
"Picasa 3", Retrieved on: Aug. 4, 2009, Available at: http://picasa.google.com/.
Satoh, et al., "Name-It: Naming and Detecting Faces in News Videos", In IEEE Conference on Multimedia, vol. 6, Issue 1, Mar. 1999, pp. 22-35.
Strong, et al., "Organizing and Browsing Image Search Results based on Conceptual and Visual Similarities", In Proceedings of the Advances in Visual Computing, Nov. 2010, 10 Pages.
Trajkova, et al., "Improving Ontology-based User Profiles", In 7th International Conference on Computer-Assisted Information Retrieval, Apr. 2004, 18 Pages.
Wang, et al., "ARISTA—Image Search to Annotation on Billions of Web Photos", In IEEE Conference on Computer Vision and Pattern Recognition, Jun. 2010, 8 Pages.
Wnuk, et al., "Filtering Internet Image Search Results Towards Keyword Based Category Recognition", In IEEE Conference on Computer Vision and Pattern Recognition, Jun. 2008, 8 Pages.
Yang, et al., "A Comparative Study on Feature Selection in Text Categorization", In Proceedings of the International Conference on Machine Learning, Jul. 1997, 9 Pages.
"Office Action Issued in Russian Patent Application No. 2008145584", Mailed Date: Mar. 25, 2011, 5 Pages.
"Second Office Action Issued in Chinese Patent Application No. 200780017842.6", Mailed Date: Jul. 6, 2011, 9 Pages.
"Non-final Office Action Issued in U.S. Appl. No. 12/563,955", Mailed Date: Oct. 13, 2011, 22 Pages.
"Third Office Action Issued in Chinese Patent Application No. 200780017842.6", Mailed Date: Mar. 20, 2012, 8 Pages.
"Final Office Action Issued in U.S. Appl. No. 12/563,955", Mailed Date: Mar. 15, 2012, 23 Pages.
"Non-final Office Action Issued in U.S. Appl. No. 12/790,761", Mailed Date: Mar. 20, 2012, 15 Pages.
"Office Action Issued in Japanese Patent Application No. 2009-511113", Mailed Date: May 25, 2012, 8 Pages.
Non-final Office Action Issued in U.S. Appl. No. 12/790,772, Mailed Date: May 24, 2012, 12 Pages.
Office Action mailed Sep. 21, 2009 for Zhang et al., "Annotation by Search," U.S. Appl. No. 11/419,368, filed May 19, 2006, 26 pages.
Response filed Oct. 30, 2009, in response to Office Action mailed Sep. 21, 2009 for Zhang et al., "Annotation by Search," U.S. Appl. No. 11/419,368, filed May 19, 2006, 22 pages.
Office Action mailed Jan. 25, 2010 for Zhang et al., "Annotation by Search," U.S. Appl. No. 11/419,368, filed May 19, 2006, 22 pages.
Response filed Jul. 26, 2010, in response to Office Action mailed Jan. 25, 2010 for Zhang et al., "Annotation by Search," U.S. Appl. No. 11/419,368, filed May 19, 2006, 16 pages.
Office Action mailed Oct. 29, 2010 for Zhang et al., "Annotation by Search," U.S. Appl. No. 11/419,368, filed May 19, 2006, 23 pages.
Response filed Feb. 28, 2011, in response to Office Action mailed Oct. 29, 2010 for Zhang et al., "Annotation by Search," U.S. Appl. No. 11/419,368, filed May 19, 2006, 46 pages.
Office Action mailed Aug. 5, 2011 for Zhang et al., "Annotation by Search," U.S. Appl. No. 11/419,368, filed May 19, 2006, 24 pages.
Response filed Jan. 3, 2012, in response to Office Action mailed Aug. 5, 2011 for Zhang et al., "Annotation by Search," U.S. Appl. No. 11/419,368, filed May 19, 2006, 25 pages.
Notice of Allowance mailed May 18, 2012 for Zhang et al., "Annotation by Search," U.S. Appl. No. 11/419,368, filed May 19, 2006, 18 pages.
Notice of Allowance mailed Aug. 17, 2012 for Zhang et al., "Annotation by Search," U.S. Appl. No. 11/419,368, filed May 19, 2006, 8 pages.
Chinese (CN) patent application No. 201310048527.7, Liu et al., "System and Method for Semantically Annotating Images," filed Feb. 6, 2013, 45 pages.
European (EP) patent application No. 13746860.9, Liu et al., "System and Method for Semantically Annotating Images," filed Jan. 28, 2013, 34 pages.
Cheng, et al., "Auto-Generation of Topic Hierarchies for Web Images from Users' Perspectives", In Proceedings of the Twelfth International Conference on Information and Knowledge Management, Nov. 8, 2003, pp. 544-547.
Huang, et al., "Image Indexing Using Color Correlograms", In IEEE Computer Society Conference Computer Vision and Pattern Recognition, Jun. 1997, pp. 762-768.
Jeon, et al., "Automatic Image Annotation and Retrieval Using Cross-Media Relevance Models", In Proceedings of the 26th Annual International ACM SIGIR Conference on Research and Development in Information Retrieval, Aug. 1, 2003, 8 Pages.
Jeon, et al., "Using Maximum Entropy for Automatic Image Annotation", In Image and Video Retrieval, Jul. 2004, 9 Pages.
Pan, et al., "Automatic Image Captioning", In IEEE International Conference on Multimedia and Expo, vol. 3, Jun. 2004, 4 Pages.
Wang, et al., "AnnoSearch: Image Auto-Annotation by Search", In Proceedings of the IEEE Computer Society Conference on Computer Vision and Pattern Recognition, vol. 2, Jun. 2006, 8 Pages.
Wang, et al., "Image Annotation Using Search and Mining Technologies", In Proceedings of the 15th International Conference on World Wide Web, May 2006, 2 Pages.
Wang, et al., "Large-Scale Duplicate Detection for Web Image Search", In Proceedings of the IEEE International Conference on Multimedia and Expo, Jul. 2006, 4 Pages.
"Web Search & Mining Group", Retrieved on: Feb. 2, 2006, Available at: http://www.research.microsoft.conn/wsm.
Zeng, et al., "Learning to Cluster Web Search Results", In Proceedings of the 27th Annual International ACM SIGIR Conference on Research and Development in Information Retrieval, Jul. 29, 2004, 8 Pages.
Wenyin, et al., "Semi-Automatic Image Annotation", In Proceedings of the Interact: Conference on HCI, Jul. 2001, 8 Pages.
Yeh, et al., "Searching the Web with Mobile Images for Location Recognition", In Proceedings of the IEEE Computer Society Conference on Computer Vision and Pattern Recognition, vol. 2, 2004, 6 Pages.
"International Search Report and Written Opinion Issued in PCT Patent Application No. PCT/US2007/012193", Mailed Date: Dec. 12, 2007, 5 Pages.
Lieberman, et al., "Aria: An Agent for Annotating and Retrieving Images", In Proceedings of the IEEE Computer Society Conference on Computer, Jul. 2001, 6 Pages.

(56) References Cited

OTHER PUBLICATIONS

Cheng, et al., "Effective Image Annotation for Search Using Multi-level Semantics", Springer-Verlag Berlin Heidelberg Dec. 2003, pp. 230-242.

Monga, et al., "Clustering Algorithms for Perceptual Image Hashing", In Proceedings of the the 3rd IEEE Digital Signal Processing Education Workshop, Aug. 2004, pp. 283-287.

Liu, et al., "Robust Photo Retrieval Using World Semantics", In Proceedings of LREC Workshop: Using Semantics for IR, Jun. 2002, 6 Pages.

Lu, et al., "A Unified Framework for Semantics and Feature Based Relevance Feedback in Image Retrieval Systems", In Proceedings of the Eighth ACM International Conference on Multimedia, Oct. 2000, pp. 31-37.

Ono, et al., "A Flexible Content-Based Image Retrieval System with Combined Scene Description Keyword", In Proceedings of the Third IEEE International Conference on Multimedia Computing and Systems, Jun. 1996, pp. 201-208.

Qiu, et al., "Compressing Histogram Representations for Automatic Color Photo Categorization", In Pattern Recognition Society, vol. 37, Issue 11, Nov. 2004, pp. 2177- 2193.

Badi, Rajiv Ravindranath, "Recognition and Representation of User Interest", Master Thesis, Texas A&M University, Dec. 2005, 72 Pages.

Chen, et al., "PVA: A Self-Adaptive Personal View Agent", In Journal of Intelligent Information Systems Research vol. 18, Mar. 2002, pp. 173-194.

Crandall, et al., "Mapping the World's Photos", In Proceedings of the 18th International Conference on World Wide Web, Apr. 24, 2009, 10 Pages.

Evans, et al., "Adaptive Multimedia Access: From User Needs to Semantic Personalisation", In Proceedings of the IEEE International Symposium on Circuits and Systems, May 24, 2006, 4 Pages.

Grear, et al., "User Profiling for Interest-Focused Browsing History", In Proceedings of the Workshop on End User Aspects of the Semantic Web (in conjunction with the 2nd European Semantic Web Conference), Jun. 2005, 4 Pages.

Gunduz, et al., "A User Interest Model for Web Page Navigation", In Proceedings of International Workshop on Data Mining for Actionable Knowledge (DMAK), Apr. 2003, pp. 46-57.

"Keyword Tool", Retrieved on: Sep. 18, 2009, Available at: https://adwords.google.com/select/KeywordToolExternal.

Huang, et al., "Image Indexing Using Color Correlograms", In Proceedings of the Conference on Computer Vision and Pattern Recognition, Jun. 19, 1997, 7 Pages.

Pan, et al., "Automatic Image Captioning", In Proceedings of the International Conference on Multimedia and Expo, vol. 3, Jun. 30, 2004, 4 Pages.

Wang, et al., "AnnoSearch: Image Auto-Annotation by Search", In Proceedings of the IEEE Computer Society Conference on Computer Vision and Pattern Recognition, vol. 2, Mar. 2006, 8 Pages.

Wang, et al., "Large-scale Duplicate Detection for Web Image Search", In IEEE International Conference on Multimedia and Expo, Jul. 2006, 4 Pages.

"Web Search & Mining Group", Retrieved on: Feb. 27, 2006, Available at: http://www.research.microsoft.com/wsm.

Wenyin, et al., "Semi-Automatic Image Annotation", In Proceedings of the Interact Conference on Human Computer Interaction, Jul. 2001, 8 Pages.

Zeng, et al., "Learning to Cluster Web Search Results", In Proceedings of the 27th Annual International ACM SIGIR Conference on Research and Development in Information Retrieval, Jul. 2004, 8 Pages.

Mei, et al., "Contextual In-Image Advertising", In Proceedings of the 16th ACM International Conference on Multimedia, Oct. 2008, pp. 439-448.

Wang, et al., "Argo: Intelligent Advertising by Mining a User's Interest from His Photo Collections", In Proceedings of the Third International Workshop on Data Mining and Audience Intelligence for Advertising, Jun. 28, 2009, 9 Pages.

Liao, et al., "LiveImage: Organizing Web Images by Relevant Concept", In Proceedings of the Workshop on the Science of the Artificial, Dec. 2005, pp. 210-220.

Broder, et al., "A Semantic Approach to Contextual Advertising", In Proceedings of the 30th Annual International ACM SIGIR Conference on Research and Development in Information Retrieval, Jul. 2007, 8 Pages.

Carneiro, et al., "Supervised Learning of Semantic Classes for Image Annotation and Retrieval", In Proceedings of the IEEE Transactions on Pattern Analysis and Machine Intelligence, vol. 29, Issue 3, Mar. 2007, pp. 394-410.

Chen, et al., "Advertising Keywork Suggesiton Based on Concept Hierarchy", In Proceedings of the International Conference on Web Search and Data Mining, Feb. 2008, 20 Pages.

Deng, et al., "ImageNet: A Large-Scale Hierarchical Image Database", In Proceedings of the IEEE Conference on Computer Vision and Pattern Recognition, Jun. 2009, 8 Pages.

Fellbaum, et al., "WordNet: An Electronic Lexical Database", In Department of Computer Science Princeton University, May 1998, 7 Pages.

Foo, et al., "Detection of Near-duplicate Images for Web Search", In Proceedings of the 6th ACM International Conference on Image and Video Retrieval, Jul. 11, 2007, 8 Pages.

Gelasca, et al., "CORTINA: Searching a 10 Million+ Images Database", In Proceedings of Conference on Very Large Data Bases (VLDB), vol. 7, Sep. 28, 2007, 4 Pages.

Griffin, et al., "Caltech-256 Object Category Dataset", In Technical Report CNS-TR-2007-001, Apr. 2007, 20 Pages.

Hays, et al., "Scene Completion Using Millions of Photographs", In Proceedings of the Transactions on Graphics, vol. 26, Issue 3, Jul. 2007, 7 Pages.

Barnes, et al., "The Generalized PatchMatch Correspondence Algorithm", In Proceedings of the 11th European Conference on Computer Vision, Sep. 5, 2010, pp. 29-43.

"Office Action Issued in European Patent Application No. 13746860.9", Mailed Date: Feb. 20, 2015, 5 Pages.

Office Action Issued in Chinese Patent Application No. 201310048527.7, Mailed Date: Oct. 28, 2015, 5 pages.

English translation, provided by Espacenet, of Abstract of CN1920820 (cited by Office Action in Chinese Patent Application 201310048527.7, Mailed Date: Oct. 28, 2015), translation available Dec. 4, 2015, at <<http:// worldwide.espacenet.com/publicationDetails/biblio?CC=CN&NR=1920820A&KC=A&FT=D>>, 1 page.

* cited by examiner

SYSTEM AND METHOD FOR SEMANTICALLY ANNOTATING IMAGES

BACKGROUND

Image retrieval techniques are used to help users browse, search, and retrieve images in a large collection of images. Such techniques enable users to search images accessible through the Internet and/or any other collection of images for one or more images that they are seeking. For example, a user may use a search engine to search for images of an object (e.g., a building) or a person (e.g., a celebrity). To this end, a user may input a search query such as "building" or "celebrity" to find the image or images that the user is seeking.

A search engine may identify one or more images in response to a user's search query based on textual annotations associated with the images being searched. In particular, a user's search query may be compared with one or more textual annotations associated with each of the images being searched and search results are presented to the user based on the outcome of the comparison(s). For example, if the user is searching for images by using the search query "building," a search engine may return images that are annotated with text including the word "building."

Consequently, the quality of image search results depends on the annotations associated with the images being searched and how such annotations are identified. Some conventional techniques for image annotation involve associating annotations with an image based on data in the document in which that image appears. For example, a search engine may identify annotations for an image appearing in a webpage from information in the web page such as information in the image tag (e.g., title, metadata, etc.) and/or information surrounding the image in the web page.

SUMMARY

Users may search for images based on textual annotations associated with the images being searched and, as such, a collection of images being searched may be annotated. However, many images being searched are typically annotated in such a way that the annotations correspond to a document (e.g., a web page) that contains an image, rather than the image itself, or any regions within the image. In turn, this limits the search logic that may be used to search for images in a collection of images and limits the manner in which search engines can index images in the collection. Accordingly, techniques are disclosed for annotating images by assigning annotations to regions of the images being searched. For example, image regions such as a pixel or a group of pixels may be annotated. The annotations may be assigned to an image region based at least in part on corresponding image regions in other images. Corresponding image regions may be image regions similar to the region being annotated and may be identified based on a measure of similarity between images and one or more image features. The obtained image region annotations may enable searching for images using expanded search logic, for example, by searching for images containing two particular types of objects next to one another.

The semantic annotation of images may also be applied in contexts other than images search. Accordingly, in some embodiments, a method is provided for semantically annotating images in a plurality of images, each image in the plurality of images comprising at least one image region. The method comprises identifying at least two similar images including a first image and a second image, identifying corresponding image regions in the first image and the second image, and assigning, using at least one processor, annotations to image regions in one or more images in the plurality of images by using a metric of fit indicative of a degree of match between the assigned annotations and the corresponding image regions. The metric of fit depends on at least one annotation for each image in a subset of the plurality of images and the identified correspondence between image regions in the first image and the second image.

In another aspect, a system is provided for enabling text-based search for images in a plurality of images based at least in part on image-level annotations associated with the images. The system comprises at least one processor configured to identify at least two similar images including a first image and a second image, identify corresponding image regions in the first image and the second image, and assign annotations to image regions in one or more images in the plurality of images by using a metric of fit indicative of a degree of match between the assigned annotations and the corresponding image regions. The metric of fit depends on at least one annotation for each image in a subset of the plurality of images and the identified correspondence between image regions in the first image and the second image.

In yet another aspect, at least one computer-readable storage medium is provided. The least one computer-readable storage medium stores processor-executable instructions that, when executed by at least one processor, perform a method for semantically annotating images in a plurality of images, each image in the plurality of images comprising one or more pixels. The method comprises obtaining at least one image-level annotation for each image in a subset of the plurality of images, identifying at least two similar images including a first image and a second image, identifying corresponding pixels in the first image and the second image, and assigning annotations to pixels in one or more images in the plurality of images by using a metric of fit indicative of a degree of match between the assigned annotations and the corresponding pixels. The metric of fit depends on at least one obtained image-level annotation and the identified correspondence between pixels in the first image and the second image.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
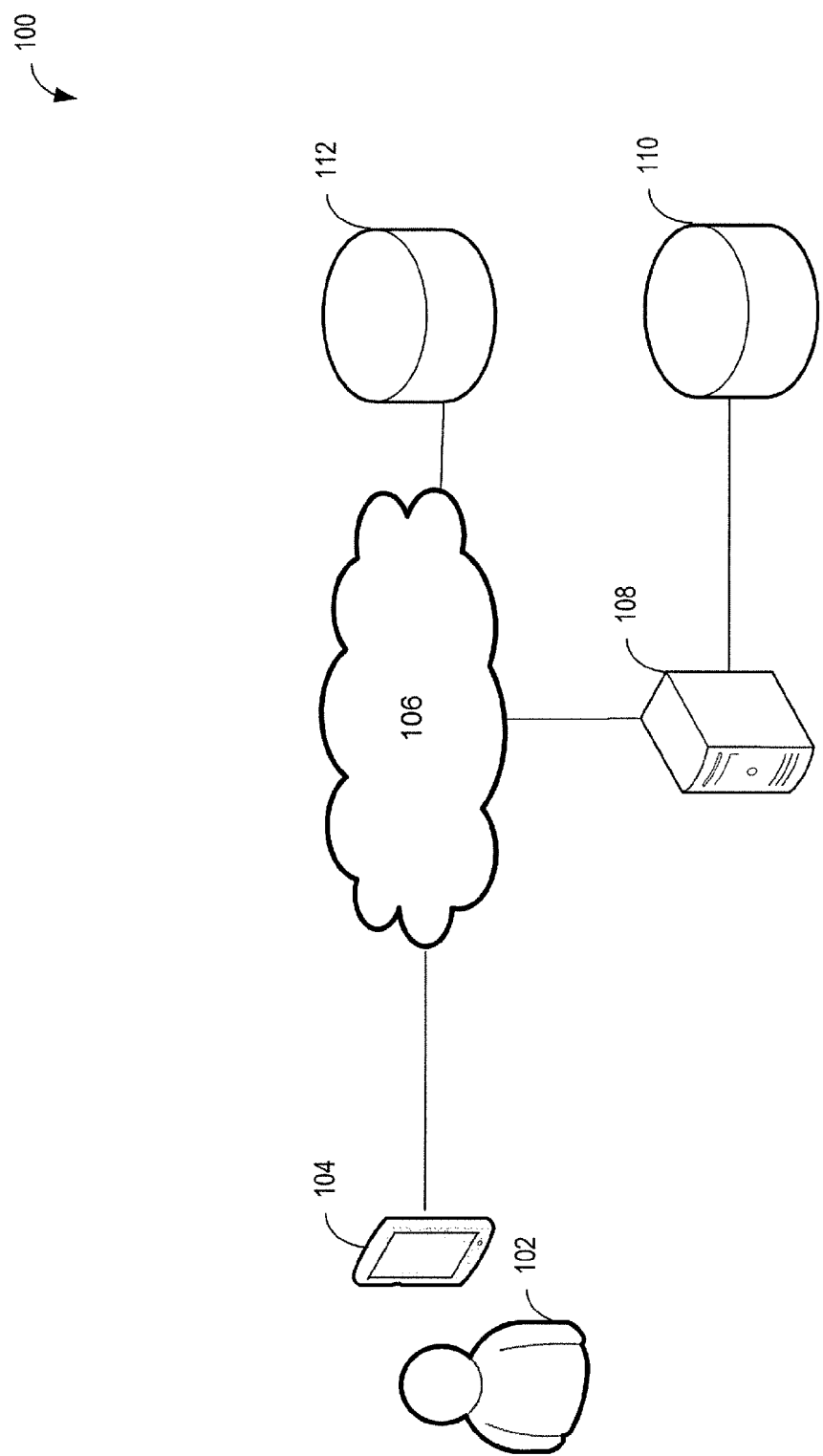
FIG. 1 shows an exemplary computing environment enabling searching for images, in accordance with some embodiments of the present disclosure.

The inventors have recognized and appreciated that improved techniques of semantically annotating images may lead to improved techniques for browsing, searching, and/or retrieving such images. As such, the inventors have appreciated that it may be desirable to semantically annotate regions of images being searched so that, for a given image, the portion of that image to which a particular annotation corresponds may be identified. For example, it may be desirable to annotate an image depicting a building, a car, and a pedestrian so that the annotations "building," "car," and "pedestrian" are associated with portions of the image depicting the building, the car, and the pedestrian, respectively.

The inventors have recognized that such semantic annotation of image regions may be used to improve existing image search techniques as well as be used in a variety of other applications including, but not limited to, image classification, clustering, and indexing. In the context of image search, for instance, the semantic annotations of image regions may enable using search queries that depend on the image region annotations. For example, a search query for an image comprising an image region with one annotation (e.g. a tree) is adjacent to an image region with another annotation (e.g., a dog) may be used. As another example, a search query for an image where a predetermined proportion (e.g., at least 25%, at least 50%, at least 75%, etc.) of image regions are associated with a particular annotation. In the context of image indexing, for instance, semantic annotations of image regions may enable search engines to improve the way in which they index images. For example, the search engines may use image region annotations to index images and, as such, refine existing indexing schemes. Many other examples will be readily apparent to those skilled in the art.

Inventive aspects include obtaining annotations of image regions by paying someone to manually annotate images. However, the inventors have appreciated that manually annotating image regions in every image is impractical because it is time-consuming and expensive. Accordingly, in some embodiments, images may be selected to be manually annotated based on a measure of cost of obtaining such manual annotations and the expected gains in overall image annotation performance resulting from obtaining them.

The inventors have also recognized and appreciated that improved image annotation techniques may be obtained when annotations associated with some images may be used to obtain annotations for other images. In particular, annotations associated with an image may be used to associate annotations to regions of another image when the image regions of the two images are similar. In particular, when two image regions are identified to be similar, based on a suitable criterion of image similarity, and one of the image regions is associated with an annotation, the same annotation may be associated with the other image region. For example, one image may depict a car and a building and the annotations "car" and "building" may be associated with the regions of the image depicting the ear and the building, respectively. Another image may depict a car and a gas station, but may not be associated with any annotations. In this case, if the regions of the two images depicting cars are found to be similar, then the region depicting a car in the other image may also be associated with the annotation "car."

The inventors have also recognized and appreciated that most conventional image annotation techniques produce image-level annotations. As previously mentioned, one such technique involves obtaining annotations from text surrounding an image in the document (e.g., a web page) containing that image. However, annotations obtained in this way are associated with an image as a whole rather than being associated with any specific portion of the image. As such, some of the images being searched may be associated only with image-level annotations. For example, the above-mentioned image may be associated with the annotations "building," "car," and "pedestrian," but it would not be known which portions of the image depict the building, the car, or the pedestrian.

Another shortcoming of conventional image annotation techniques is that many of the images that may be searched are not associated with any annotations at all, let alone the image-region annotations as described above. Indeed, only a small proportion of the images being searched may be surrounded by text containing information about the contents of the image (e.g., a caption stating, "the above image contains a building, a car, and a pedestrian").

Yet another shortcoming of conventional image annotation techniques is that, in cases where image-level annotations are associated with images, many such annotations may be inaccurate or partially inaccurate because they are obtained from text surrounding an image rather than being derived from the image itself. For example, the above-mentioned image may be in an article about cars and, as such, the image may be associated with the annotation "car," but not the annotations "building" or "pedestrian." Although, the image may even not be associated with the annotation "car."

The inventors have recognized and appreciated that assigning annotations to image regions based at least in part on identified correspondences between image regions in the images to be annotated may overcome some of the above-mentioned drawbacks of conventional techniques for image annotation. However, not every embodiment addresses every one of these drawbacks, and some embodiments may not address any of them. As such, it should be appreciated that the invention is not limited to addressing all or any of the above-discussed drawbacks of these conventional techniques for image annotation.

Accordingly, in some embodiments, a method for semantically annotating images by assigning annotations to regions of images in an image set may be performed. As previously mentioned, such a method may be used in one or more ways, including to obtain an improved system for browsing, searching, and/or retrieving images from this set of images.

In some embodiments, one or more image regions, in one or more images, may be annotated by using a metric of fit indicative of a degree of match between the assigned annotations and the corresponding image regions. One or more annotations may be assigned to an image region. The metric of fit, in turn, may depend on any of numerous factors and, for example, may depend on identified correspondences between the image region(s) to be annotated and one or more other image regions. As such, the image region(s) may be annotated based on their similarity to the other image region(s) and/or based on the annotations associated with the other image region(s).

In some embodiments, the assignment of annotations to one or more image regions may be performed iteratively based on the metric of fit. In each iteration, one or more image-level annotations may be used to assign annotations to the image region(s) and, subsequently, the assignments may be updated based at least in part on correspondences identified between the image region(s) and one or more other image regions. Such correspondences may be identified in any of numerous ways including, but not limited to, the manner as described in greater detail below with reference to FIG. 3.

An annotation may be any suitable type of annotation. In some embodiments, the annotation may be a textual annotation such as an alphanumeric string comprising one or more characters or numbers, one or more words, one or more phrases, one or more sentences, etc. An annotation may be an image-level annotation and, as such, may be associated with an image as a whole. An annotation may be an image-region annotation and, as such, may be associated with a region of an image.

An image region may be any suitable portion of an image. An image region may be a portion of the image depicting at least a part of a particular object (e.g., a car). An image region may also depict (at least parts of) multiple objects, at least a part of a person or person(s), and/or at least a part of any other identifiable portion or portions of the image. For example, in an image depicting a car and a building, an image region may be any suitable region depicting at least portion of the car, at least a portion of the building, or any suitable combination thereof. An image region may be any suitable size. In some embodiments, an image region may be a pixel or a group of pixels.

It should be appreciated that the various aspects and concepts of the present invention described herein may be implemented in any of numerous ways, and are not limited to any particular implementation technique. Examples of specific implementations are described below for illustrative purposes only, but the aspects of the invention described herein are not limited to these illustrative implementations.

FIG. 1 shows a non-limiting illustrative environment 100 in which embodiments of the present invention may operate. For purposes of illustration, the invention is described in connection with a system enabling a user to search for images. However, it should be appreciated that an image search system is only an example of a system in which techniques for semantically annotating images may be applied and that such techniques may be applicable in a variety of other settings to problems such as, but not limited to, image classification, clustering, and/or indexing.

In the illustrative environment, user 102 may search for one or more images that user 102 is seeking by providing a search query to a software application executing on mobile device 104. The software application may be any suitable application and, for example, may be an application such as a web browser. Though, it should be recognized that the software application is not limited to being a web browser and may be any suitable application that may provide the user with an interface for searching for images among any suitable set of images. It should also be recognized that the user is not limited to using a mobile device and may use any other suitable computing device (e.g., a desktop computer, a laptop computer, a tablet computer, etc.) to input a search query.

The search query may be any suitable search query. In some embodiments, the search query may be a textual search query and may be an alphanumeric string comprising one or more characters or numbers, one or more words, one or more phrases, one or more sentences, etc. The search query may be input by the user in any suitable manner and, for example, may be typed in, spoken by the user, selected by the user among one or more options, or any suitable combination thereof.

The search query may be received, via network 106, by server 108, which may be configured to use the search query to search for one or more images in a collection of images. Network 106 may be any suitable network and, for example, may comprise the Internet, an intranet, a LAN, a WAN, and/or any other wired or wireless network, or combination thereof.

Server 108 may be configured to search for one or more images in any suitable collection of images. For example, server 108 may be configured to search for images in one or more databases (e.g., database 110 and/or database 112). Server 108 may be configured to search for images among images stored locally (e.g., database 110) and/or remotely (e.g., database 112). In some embodiments, server 108 may be configured to search for images among images that may be stored in multiple distributed locations, as the case may be when searching for images on the Internet (or any other suitable network such as a corporate network). It should be recognized, that server 108 may be one computing device or multiple computing devices as aspects of the present invention are not limited in this respect.

Regardless of which images server 108 may be configured to search, server 108 may be configured to perform the search in any suitable way. In some embodiments, server 108 may be configured to search for images that the user may be seeking by comparing the user's search query with one or more annotations associated with the images being searched. Such a comparison may be performed in any suitable way, as the precise manner in which a user's search query and image annotations are compared is not a limitation of aspects of the present invention.

Regardless of the manner in which server 108 may be configured to search for images by using the search query provided by user 102, server 108 may be configured to present at least a subset of the search results to user 102. Search results may be presented to user 102 in any suitable way as the manner in which search results are presented is not a limitation of aspects of the present invention.

In some embodiments, server 108 may be configured to semantically annotate one or more images that server 108 may be configured to search. For example, server 108 may be configured to semantically annotate one or more images in database 110 and/or database 112. As another example, server 108 may be configured to semantically annotate one or more images that may be accessed via network 106 (e.g., the Internet, an intranet, etc.). Though it should be recognized that, in some embodiments, the system used for searching images may be different from the system used to semantically annotate images as aspects of the present invention are not limited in this respect.

Server 108 may be configured to semantically annotate one or more images in any suitable way. In some embodiments, server 108 may be configured to assign one or more annotations to image regions in the image(s) that server 108 may be configured to semantically annotate. As such, server 108 may be configured to assign the annotation(s) by using a metric of fit indicative of a degree of match between the assigned annotations and the corresponding image regions. This is described in greater detail below with reference to FIGS. 3 and 4A-4B.

Figure 2B:
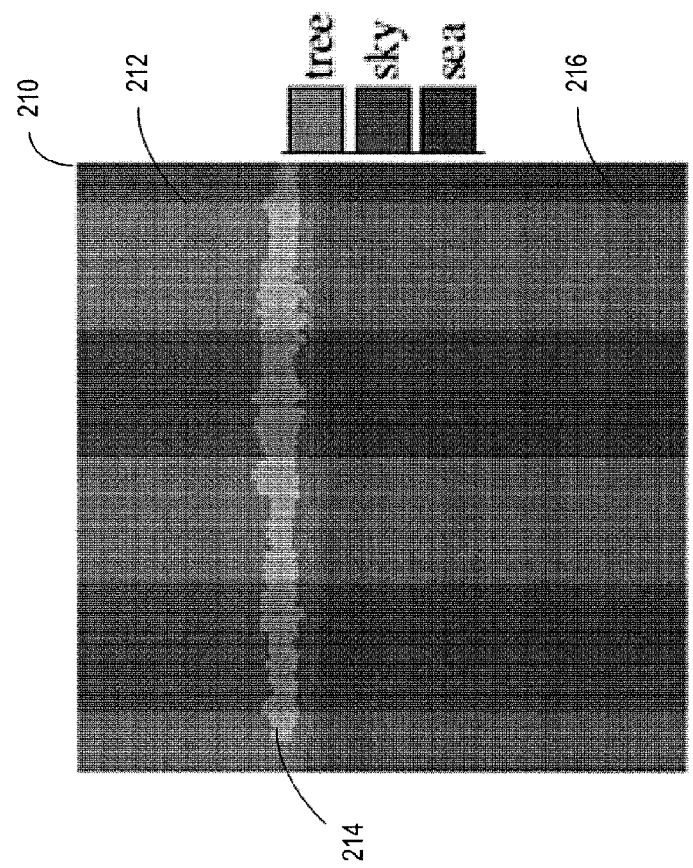
FIGS. 2A-2B show an illustrative example of semantically annotating an image, in accordance with some embodiments of the present disclosure.
Figure 2A:
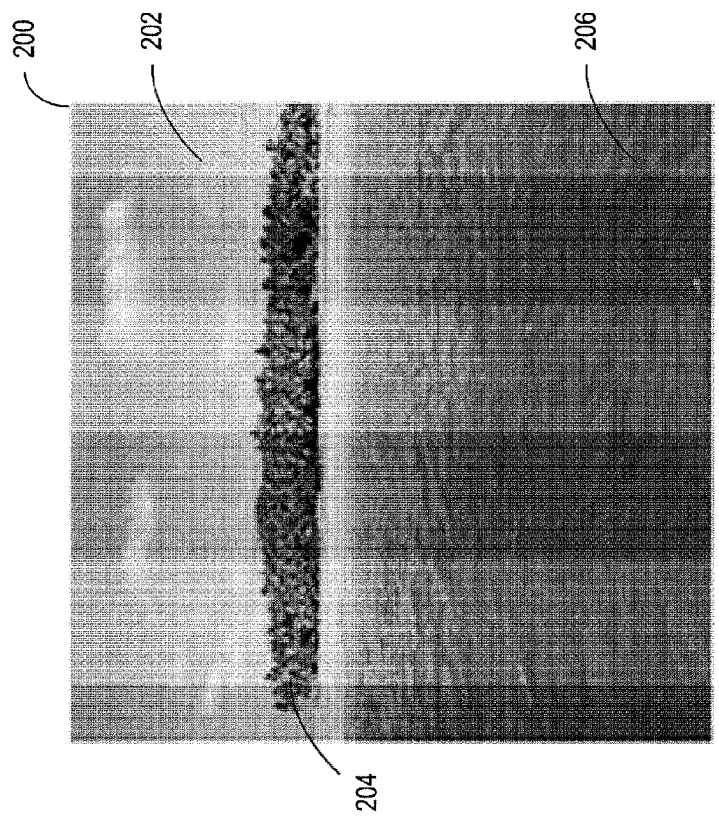

FIGS. 2A and 2B show an illustrative example of semantically annotating an image. In particular, FIG. 2A shows illustrative image 200 that shows sky 202 separated by trees 204 from sea 206. Semantically annotating image 200, as server 108 may be configured to do, may result an assignment of annotations to regions in image 200. One such assignment is illustrated in FIG. 2B as assignment 210, which assigns to each pixel in image 200 an annotation in the set {"tree," "sky," and "sea"}. Set of pixels 212 comprises pixels each assigned the annotation "sky." Set of pixels 214 comprises pixels each assigned the annotation "tree." Set of pixels 216 comprises pixels each assigned the annotation "sea."

It should be recognized that although, in the illustrated embodiment, each pixel of image 200 is assigned an annotation, semantically annotating an image is not limited to annotating all pixels in the image. For example, in some embodiments, image regions comprising multiple pixels may be annotated. As another example, only a subset of the pixels of the image may be annotated. It should be appreciated that, although in the illustrated embodiment, each image region is assigned a single annotation, this is not a limitation of aspects of the present invention as an image region may be assigned one or more annotations. This may be accomplished in any suitable way and, for example, may be accomplished through a layered representation of the image.

Figure 3:
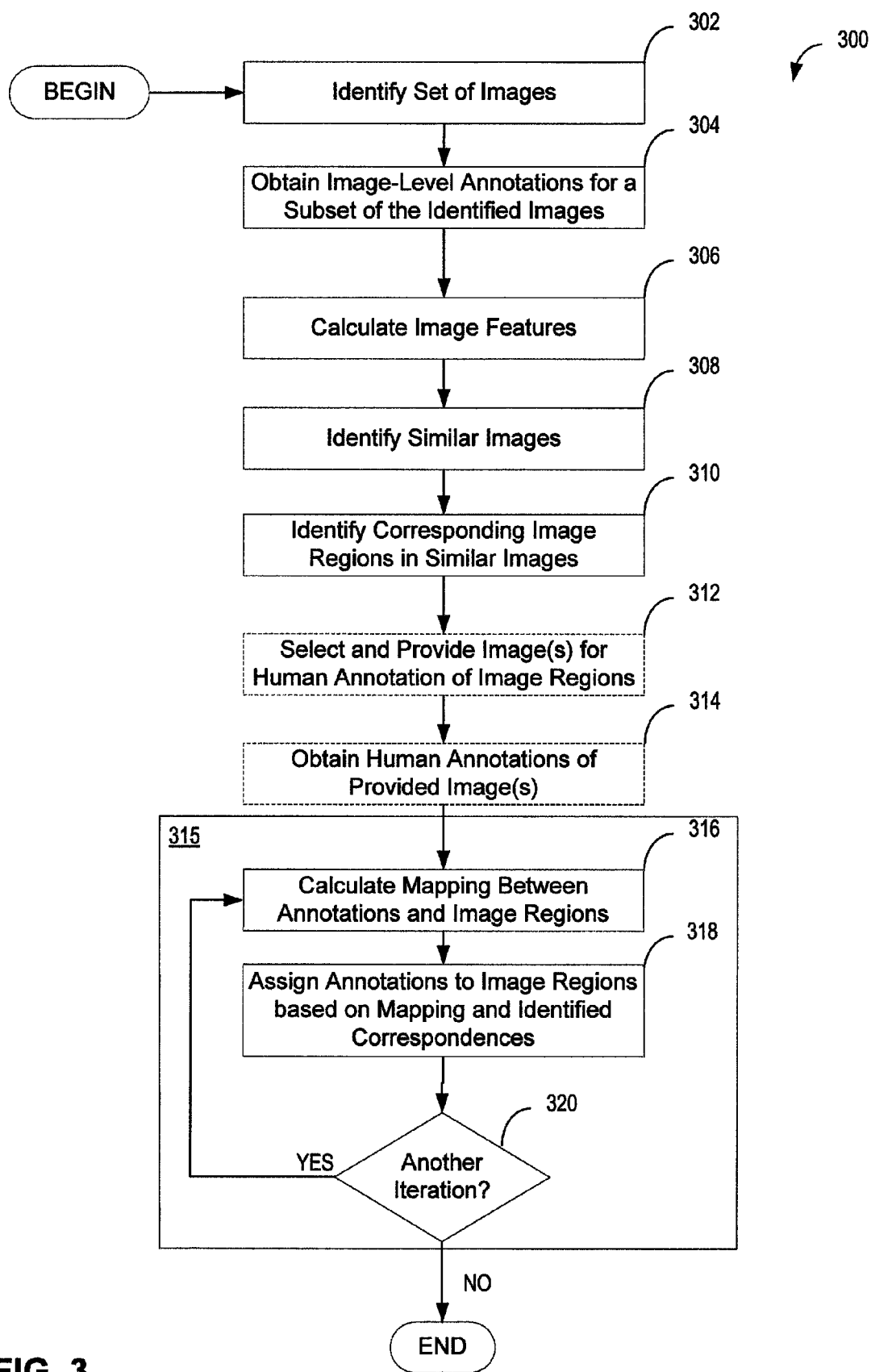
FIG. 3 is a flow chart of an illustrative process for semantically annotating images, in accordance with some embodiments of the present disclosure.

As previously mentioned, server 108 may be configured to search for images based on a user-provided search query and one or more annotations associated with the images being searched. One method for obtaining such annotations is illustrated in FIG. 3, which shows an illustrative process 300 for semantically annotating images. Process 300 may be performed by a system configured to search for images, such as system 100 described with reference to FIG. 1, or by any other suitable system configured to semantically annotate one or more images.

Process 300 begins in act 302, where an image set to be annotated is identified. The image set to be annotated may be any suitable set of images and, for example, may be an image set accessible via a network (e.g., Internet, intranet, etc.) and/or an image set stored in one or more databases. The image set to be annotated may be identified in any suitable way. In some instances, the image set to be annotated may be manually specified (e.g., by a user, an administrator, in a configuration file, etc.). Additionally or alternatively, the image set to be annotated may be identified automatically (e.g., by accessing one or more web pages, one or more documents, one or more databases storing one or more images, etc.).

After an image set to semantically annotate is identified, in act 302, process 300 proceeds to act 304, where one or more image-level annotations are obtained for each image in a subset of the identified images. Image-level annotations may be obtained for each image in any suitable subset of the identified images. For example, image level annotations may be obtained for a subset comprising 25 percent or less of the identified images, 5 percent or less of the identified images, 1 percent or less of the identified images, etc.

Image-level annotations may be obtained in any of numerous ways. In some instances, one or more image-level annotations for an image may be obtained from data associated with the image. Data associated with an image may be any suitable data and, for example, may comprise data in a document (e.g., text in a web page, an article, an e-mail, etc.) that contains the image, metadata associated with the image (e.g., information in the image header), and/or any of numerous other types of data associated with the image. In some instances, image-level annotations may be obtained automatically (e.g., by accessing one or more web pages, one or more documents, one or more databases storing one or more images, etc.). Additionally or alternatively, one or more image-level annotations may be manually specified.

It should be recognized that process 300 is not limited to obtaining only image-level annotations, and that, optionally in act 304, one or more image-region annotations may be obtained for one or more images in the set of identified images.

Next, process 300 proceeds to acts 306, 308, and 310, where correspondences among image regions (of images identified in act 302) may be identified. As previously mentioned, such correspondences may be used to improve annotations assigned to image regions because similarity between two image regions may indicate that both image regions may be assigned the same annotation.

In order to identify correspondences among image regions, process 300 first proceeds to act 306, where image features are calculated from images in the image set obtained in act 302. Though, it should be recognized that features calculated in act 306 may be used for any suitable purpose and are not limited to being used only for identifying correspondences among image regions.

Any of numerous types of image features may be calculated for an image as part of act 306. In some embodiments, local image features may be calculated for one or more image regions in the image. For instance, local image features may be calculated for one or more pixels in the image and/or for one or more groups of neighboring pixels in the image. Local image features may be indicative of local image structure, local color information, and/or any other suitable type of information. Such local image features may be obtained according to processing as is known in the art. For example, scale-invariant feature transform (SIFT) features may be calculated for each of one or more image regions. As another example, histogram of oriented gradients (HOG) features may be calculated for each of one or more image regions. Additionally or alternatively, global image features (e.g., "GIST" features) may be calculated for an image as part of act 306. As such, multiple features (e.g., tens of features, hundreds of features, etc.) may be calculated for each of one or more image regions (e.g., pixels or groups of pixels) in an image. Below, the vector $D_i(p)$ may denote the features calculated for the p'th image region of the i'th image.

As a specific non-limiting example, SIFT and/or HOG features may be calculated for each of one or more pixels in an image. SIFT features for a pixel may be calculated by using one or more sets of pixels near the pixel (e.g., pixels within three pixels of the pixel, pixels within seven pixels of the pixel) in order to account for feature scale. Additionally, HOG features may be calculated by using rectangular patches (e.g., 2×2 patches) of pixels.

As previously mentioned, the number of features calculated, during act 306, for each image region may be large. Accordingly, in some embodiments, the number of features associated with each image region may be reduced by using any suitable dimensionality reduction techniques known in the art, including principal components analysis (PCA), weighted PCA, locally linear embedding, and/or any other linear or non-linear dimensionality reduction technique. As such, any suitable number of features (e.g., 5, 10, 25, 50, 75, 100, etc.) may be associated with each image region.

Next, process 300 proceeds to act 308, where one or more groups of similar images may be identified, each such group comprising at least two images from the image set identified at act 302. In some embodiments, one or more groups of similar images may be identified by identifying one or more similar images to each image in the image set identified in act 302. A group of similar images may be identified by using a measure of similarity indicative of a degree of similarity between pairs of images. In particular, any suitable clustering algorithm may be used to identify groups of similar images by identifying, as similar, any pair of images for which the calculated measure of similarity is greater than a predetermined threshold.

In some embodiments, calculating a measure of similarity between two images may comprise calculating a distance between features associated with each of the two images. To this end, any suitable distance function and any suitable image features (e.g., any image features computed at act 306) may be employed. In some instances, calculating a measure of similarity between two images may comprise calculating a Euclidean distance between global features associated with each of the two images. Though, it should be recognized that any other suitable measure of similarity may be used.

Figure 4B:
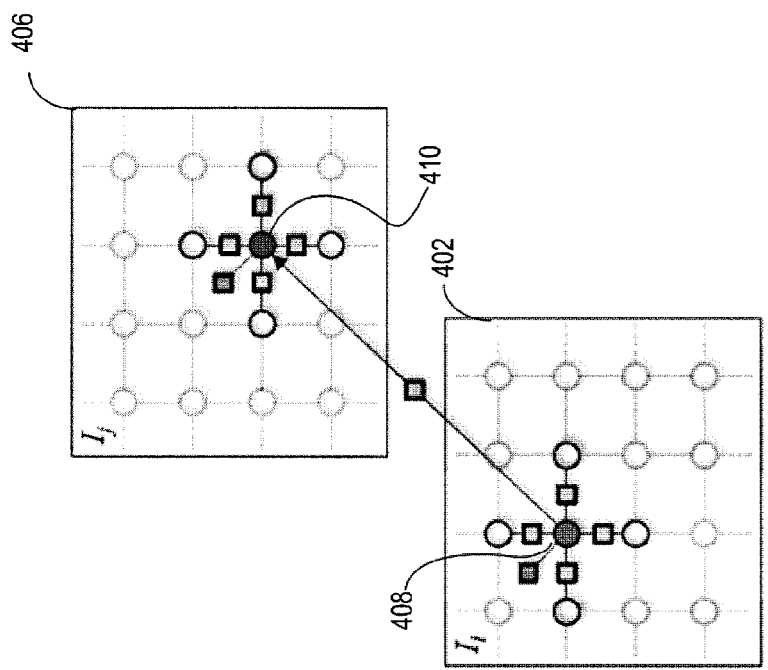
FIG. 4B illustrates identifying corresponding image regions in a pair of similar images, in accordance with some embodiments of the present disclosure.
Figure 4A:
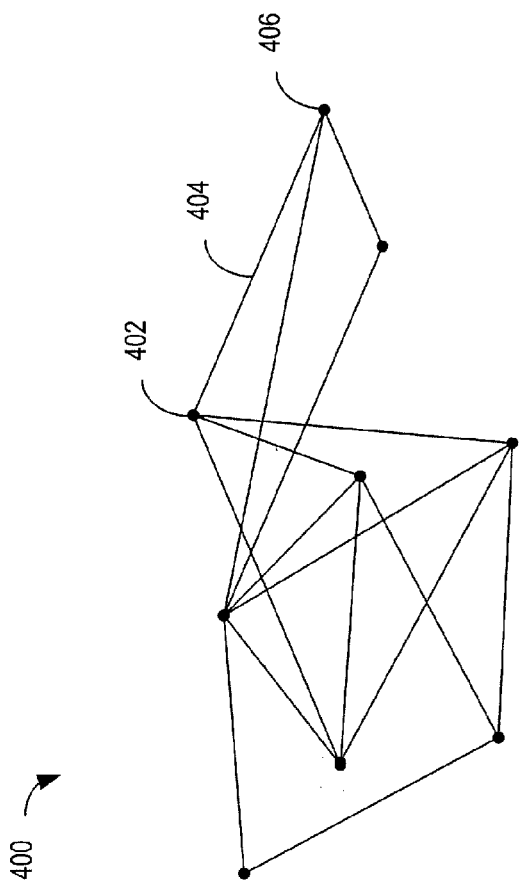
FIG. 4A illustrates a data structure representing similar images, in accordance with some embodiments of the present disclosure.

In some embodiments, it may be convenient to represent groups of similar images, identified in act 306, as a data structure embodying a graph comprising vertices that represent images and edges that represent similarity between the images. One such graph is shown in FIG. 4A, which shows illustrative graph 400 comprising nodes 402 and 406 connected by edge 404. The presence of edge 404 may indicate that the measure of similarity calculated for the pair of images represented by nodes 402 and 404 is greater than a predetermined threshold. It should be appreciated that the edges in the graph are not necessarily limited to being symmetric and may, in some instances, be directed edges. It should be appreciated that the graph shown in FIG. 4A is merely illustrative and that, in practice, the graph may comprise any suitable number of nodes (e.g., at least 100, at least 1000, at least 10,000, at least 100,000, at least 1 million, at least 10 million etc.) in order to represent images in a large set of images.

Next, process 300 proceeds to act 310, where corresponding image regions in similar images may be identified. Corresponding image regions may be identified in one or more pairs of images identified as being similar in act 308. For example, corresponding image regions may be identified for any two images represented by connected vertices in a graph such as the illustrative graph shown in FIG. 4A. Identifying corresponding image regions in a pair of similar images may comprise identifying one or more regions in one image with one or more regions in the other image. FIG. 4B shows an illustrative, non-limiting example of identifying corresponding image regions in a pair of images. In the illustrated example, image region (e.g., pixel) 408 of image 402 is identified as corresponding to image region (e.g., pixel) 410 of image 406.

Corresponding image regions between two images may be identified in any suitable way. The correspondence may be identified based at least in part on an objective function indicative of a degree of similarity between the image regions. Any suitable objective function may be used. In some instances, the objective function may depend at least in part on the image features associated with the image regions. Any suitable features may be used including, but not limited to, any of the features calculated in act 306 of process 300.

In some embodiments, the objective function may depend on any of numerous measure of distance known in the art (e.g., Euclidean distance, $l_1$ distance, $l_p$ distance, etc.) between the image features associated with the image regions. Additionally or alternatively, the objective function may include a so-called "regularization" term to make the objective function less sensitive to small variations in feature values. As a specific non-limiting example, the following objective function (the so-called "SIFT-flow" objective function) may be used to identify corresponding image regions between image $I_i$ and image $I_j$:

$$E(w) = \sum_{p \in \Lambda_i} |S_i(p) - S_j(p + w(p))| + \alpha \sum_{p,q \in N(p)} |w(p) - w(q)|$$

In the above equation, w(p) represents the region in image $I_j$ identified as corresponding to image region p in image $I_i$. Furthermore $\Lambda_i$ represents the set of image regions of image $I_i$ (e.g., the lattice of image $I_i$ in cases when an image region is a single pixel), N(p) represents the image regions close to (as measured by any suitable distance function) image region p, and $\alpha$ is a tuning parameter used to control the effect of the regularization term. In some embodiments, $\alpha$ may be set to any suitable number between 0 and 1 and, for example may be set to be 0.1 or 0.25 or 0.5 or any other suitable value that captures spatial statistical properties of the flow field w(p).

Corresponding image regions between image $I_i$ and image $I_j$ may be identified by using the above objective function (or any other suitable objective function) to obtain the mapping w, which associates image regions in image $I_i$ with image regions in image $I_j$. This may be done using any of numerous inference algorithms including, but not limited to, belief propagation and optimization techniques including, but not limited to, gradient descent and expectation maximization.

Next, process 300 proceeds to optional acts 312 and 314 (as indicated by the dashed lines), where image-region annotations may be obtained from one or more human annotators. As previously mentioned, manually annotating image regions in a large number of images may be time-consuming and expensive. However, in embodiments where such resources are available, it may be advantageous to obtain image-region annotations for a subset of the images, identified act 302, from one or more human annotators.

Accordingly, in some embodiments, a subset of images (e.g., less than 2%, less than 1%, less than 0.1%, less than 0.01%, etc.) of images identified in act 302 may be provided to one or more human annotators so that they may assign annotations to one or more image regions in each such region. Though, it should be recognized that any suitable number of images may be selected for human annotations.

The number of images to provide to human annotators may be selected in any suitable way. In some embodiments, the number of images may be selected based on any of numerous factors known in the art to be indicative of the accuracy of the determined assignments of annotations to image regions. Examples of such factors include, but are not limited to, the numbers of true positives, false positives, false negatives, true negatives, false alarm ratio, missed detection ratio, and quantities derived therefrom such as precision and recall. Such quantities may be obtained in any suitable way. For instance, they may be estimated by using a set of pilot images with known image region annotations or in any other suitable way. In some embodiments, the number of images may be selected based on the monetary cost associated with manually annotating an image. As such, the number of images may be selected based on an overall budget available for manual annotation.

In some embodiments, the number of images may be selected by using an objective function depending on any of the above factors. The objective function may depend on any of the above-identified or other factors in any suitable way. As a specific example, the objective function may be given by:

$$F(\rho_t, \rho_l) + \alpha C(\rho_t, \rho_l)$$

where the first term corresponds to the so-called F-measure, characterizing accuracy of the labeling, given by:

$$F(\rho_t, \rho_l) = \frac{(\beta^2 + 1)PR}{\beta^2 P + R}$$

where $\rho_t$ is the percentage of images with image-level annotations and $\rho_l$ is the percentage of images with image region annotations provided by human annotators, and P and R are the corresponding precision and recall, respectively. The parameter $\beta$ may be set to less than 1 to emphasize precision and may be set to greater than 1 to emphasize recall. The second term in the above objective function is a cost function reflects the cost of obtaining human annotations in accordance with $\rho_l$. Finally, the parameter $\alpha$ may be set to balance the relative importance of the F-measure with that of the cost function.

Regardless of the number of images to be provided for human annotation, the images provided to human annotators may be selected in any suitable way. In some instances, the images provided to human annotators may be randomly selected. However, in other instances, the images may be selected based at least in part on the groups of similar images that were identified in act 308 of process 300. For example, in some embodiments, images may be selected based on a graph representing images and similarities among them (e.g., the graph shown in FIG. 4A). This may be done in any suitable way and, for example, may be done based at least on the structure of the graph. For example, images to select may be identified by using a page-rank type algorithm. Such an algorithm may be used to identify images similar to large groups of images with no annotations and/or only partial annotations and to select such images for annotation by one or more human annotators.

Additionally or alternatively, images to select may be identified by first clustering images identified in act 302 into a predetermined number of groups and then selecting images closest to the center of each group as images to be provided to human annotators. In this case, the clustering as well as the determination of the closeness of an image to the center of a group of images may be performed by using any suitable measure of similarity indicative of similarity between images and, for example, may be performed by using any suitable measure of similarity, including any previously-discussed measure of similarity. The predetermined number of clusters may be any suitable number and, in some instances, may depend on the number of images to be provided for human annotation Regardless of the way in which images may be selected for human annotation, the selected images are provided to one or more human annotators in act 312. The images may be provided to human annotators in any suitable way, as this is not a limitation of aspects of the present invention. Next, process 300 proceeds to act 314, where one or more annotations performed by the human annotators may be obtained. In some embodiments, additional input from a human annotator may be obtained including, but not limited to, an indication of an amount of confidence associated with one or more annotations provided by that annotator. The annotations may be obtained in any suitable way, as this is not a limitation of aspects of the present invention.

Next, process 300 proceeds to set of acts 315, including acts 316 and 318 and decision block 320, where one or more annotations may be assigned to one or more image regions identified in act 302. This may be done in any suitable way and, for example, may be done by using a metric of fit indicative of a degree of match between the assigned annotations and the corresponding image regions, as previously mentioned.

The metric of fit may depend on numerous factors including, but not limited to, the image-level annotations (e.g., obtained in act 302) associated with the images identified in act 302, one or more of the image features computed in act 306, correspondences between the image regions to be annotated identified in act 310, and the annotations obtained (if any) in optional act 314. Though, it should be recognized that the above-listed factors are illustrative and that the metric of fit may depend on any of numerous other factors in addition to or instead of the above-listed factors.

In some embodiments, annotations may be assigned to the image regions iteratively. Set of acts 315 may be performed for each such iteration. In each iteration, a mapping between annotations and image regions may be obtained, as discussed with respect to act 316. The mapping may identify one or more annotations that may be assigned to specific image regions and, for example, may be a statistical mapping as described in further detail below. Subsequently, as discussed with respect to act 318, annotations may be assigned to image regions based at least in part on the calculated mapping and the correspondences identified between the image region(s) and one or more other image regions (e.g., the correspondences identified in act 310).

First, in act 316, an initial estimate of a mapping between annotations and image regions may be obtained. The mapping may be a mapping between any suitable set of annotations and any suitable set of image regions. The set of image regions may comprise one or more regions of the images identified in act 302. The set of annotations may comprise any of the annotations obtained in act 304 and/or any of the annotations obtained in act 314. Though, it should be recognized that aspects of the present invention are not limited to using annotations obtained in acts 304 and/or 314 and may use annotations obtained in any suitable way from any other suitable source such as a dictionary, an encyclopedia, content of any document or collection of documents, etc.

The mapping may be any suitable type of mapping. In some instances, the mapping may be a statistical mapping assigning a value to the likelihood that a particular annotation may correspond to a particular image region. In some embodiments, such a mapping may be realized by using a generative probabilistic model, which may be used to obtain a probability that a particular annotation may correspond to a particular image region. One specific example of such a generative probabilistic model is described below. Though, it should be recognized that the mapping is not limited to being realized by using a generative probabilistic model and other approaches (e.g., a discriminative approach based on randomized forests) may be employed.

Any suitable generative probabilistic model may be employed. For example, in some embodiments, any of numerous types of mixture models may be employed. For example, a mixture model comprising a mixture element for one or more of the annotations in the set of annotations may be employed. As another example, a mixture model comprising an element for each of the annotations in the set of annotations may be employed so that if the set of annotations comprises L annotations, the mixture model may comprise L elements.

A specific illustrative example of a generative probabilistic model is now described. To this end, let $c_i(p)$ denote the assignment of one of L annotations to image region p in image $I_i$. In this example, the generative probabilistic model is a mixture model comprising a mixture element for each of the L annotations, and is given by:

$$P(c_i(p); \Theta) = \sum_{l=1}^{L} \left( \rho_{i,l}(p) \sum_{k=1}^{M} \pi_{l,k} N\left(D_i(p); \mu_{l,k}, \sum_{l,k}\right) \right) + \rho_{i,\epsilon}(p) N(D_i(p); \mu_\epsilon, \Sigma_\epsilon)$$

Note that each element in the above-specified mixture model is a Gaussian mixture model with M components. Each Gaussian mixture model is weighted by the weight $\rho_{i,l}(p)$ of the l'th Gaussian mixture model generating the feature $D_i(p)$. The variables $\pi_{l,k}$, $\mu_{l,k}$ and $\Sigma_{l,k}$ are the mixture weight, mean, and covariance of component k in Gaussian mixture model l, respectively. Additionally, the above-specified mixture model includes an outlier model where $\rho_{i,\epsilon}(p)$ and $\mu_\epsilon$, $\Sigma_\epsilon$ are the weights, mean, and covariance parameters of the outlier model for each image region p in image $I_i$. As such, letting $\theta_i$ denote the parameters of the i'th Gaussian mixture model, the vector of all the parameters of the above generative probabilistic model is given according to:

$$\Theta = (\{\rho_{i,l}\}_{i=1:N, l=1:L}, \{\rho_{i,\epsilon}\}_{i=1:N}, \theta_1, \ldots, \theta_L, \theta_\epsilon)$$

As part of act 316 of process 300, the mapping from annotations to image regions may be obtained in any suitable way. The mapping may be specified by one or more parameters and the parameter(s) may be calculated based at least in part on the image features obtained in act 306 and image-level annotations obtained in act 302. Additionally, in some embodiments, the parameter(s) may be calculated based on any image-region annotations that may be obtained from one or more human annotators in act 314 of process 300.

Any suitable technique may be used to calculate one or more parameters of the mapping from the obtained annotations and image features. For example, any of numerous parameter estimation techniques may be used including, but not limited to, maximum likelihood methods and Bayesian parameter estimation techniques. In some embodiments, the expectation maximization (EM) algorithm may be used. For example, the EM algorithm may be used to estimate the parameters $\theta$ of the above-specified mixture model. In this case, an initial estimate of the parameters $\theta$ may be obtained and this initial estimate may be iteratively refined by using one or more iterations.

The initial estimate may be obtained in any of numerous ways. For example, the initial estimate may be obtained by clustering the image features obtained in act 306 into L clusters by using any suitable clustering algorithm (e.g., K-means) and a Gaussian mixture model may be fitted to each cluster using any suitable technique. The outlier model may be initialized from randomly selected image regions selected from images identified in act 302. To account for partial annotations, features obtained from an image may be weighted based on whether the image is associated with image-region annotations (that may have been obtained in act 314), image-level annotations (obtained in act 302), or no annotations. The weights for features obtained from images associated with image region annotations may be higher than the weights for features obtained from images associated image-level annotations, which, in turn, may be higher than the weights for features obtained from images that are not annotated.

After the initial estimate of the parameters $\theta$ is obtained, and regardless of the way in which it is obtained, this estimate may be refined, for example, by using a maximum likelihood estimate. In some instances, a modified maximum likelihood estimate may be employed in order to encourage contrast between the Gaussian mixture models. In this case, the means of the Gaussian mixture models may be updated according to:

$$\mu_{l,k}^{(n+1)} = \frac{\sum_{i,p \in \Lambda_i} w_i \gamma_{i,l,k}(p) D_i(p) - \alpha \eta}{\sum_{i,p \in \Lambda_i} w_i \gamma_{i,l,k}(p) - \alpha}$$

where $$\gamma_{i,l,k}(p) = \frac{\rho_{i,l}(p) \pi_{l,k} G_{l,k}(D_i(p))}{\sum_{j=1}^{L} \rho_{i,j}(p) GMM_j(D_i(p)) + \rho_{i,\epsilon} G_\epsilon(D_i(p))},$$

$$GMM_l(x) = \sum_{k=1}^{M} \pi_{l,k} G_{l,k}(x),$$

$$G_{l,k}(x) = N\left(x; \mu_{l,k}, \sum_{l,k}\right),$$

and $$\eta = \operatorname{argmin}_{\mu_{j \neq l,m}^{(n)}} \|\mu_{l,k}^{(n)} - \mu_{j,m}^{(n)}\|,$$

where $\alpha$ is a tuning parameter that may be set in any suitable way.

Though, it should be recognized that any of numerous other ways may be used to update the parameters of the Gaussian mixture models, as aspects of the present invention are not limited in this respect.

Accordingly, a probability that annotation 1 may be mapped to image region p may be calculated according to:

$$\rho_{i,l}(p) = \frac{GMM_l(D_i(p))}{\sum_{j=1}^{L} GMM_j(D_i(p)) + G_\epsilon(D_i(p))}.$$

Regardless of the way that the mapping from annotations to image regions may be calculated in act 316, process 300 next proceeds to act 318, where one or more annotations may be assigned to image regions based at least in part on the mapping and the correspondences identified between the image region(s) and one or more other image regions (e.g., the correspondences identified in act 310).

In some embodiments, the assignments may be obtained based on a metric of fit that may depend on the mapping obtained in act 316 and on the identified correspondences among image regions. The annotations assigned to image regions may be those annotations which optimize the value of the metric of fit. For example, in some embodiments, the annotations assigned to image regions may correspond to annotations computed by using the metric of fit and the maximum a posteriori criterion. Though, it should be recognized that any other suitable criterion may be used together with the metric of fit to obtain an assignment of annotations to image regions.

As previously noted, by using a metric of fit to assign annotations to image regions, an annotation may be assigned to a particular image region based at least in part on an annotation assigned to one or more other image regions such as an image region identified as the corresponding image region to the particular image region, an image region neighboring the particular image region in the image comprising the particular image region, and/or any other suitable image region or regions.

Any of numerous metrics of fit that depend on one or more of the above-mentioned factors may be used. One specific example of a metric of fit is given by:

$$E(c) = \sum_{i=1}^{N} \sum_{p \in \Lambda_i} \left[ \Phi_p(c_i(p)) + \Phi_s(c_i(p)) + \Phi_c(c_i(p)) + \sum_{j \in N(i)} \Psi_{ext}(c_i(p), c_j(p + w_{ij}(p))) + \sum_{q \in N(p)} \Psi_{int}(c_i(p), c_i(q)) \right]$$

The first term in this metric of fit is defined according to:

$$\Phi_p(c_i(p) = l) = -\log P(c_i(p) = l; \Theta) - \log P_i(l),$$

with $$P_i(l) = \frac{\beta}{|N(i)|} \sum_{j \in N(i)} \delta[l \in t_j] + \frac{1-\beta}{Z} \sum_{j \in N(i)} \sum_{m \in t_j} h^o(l, m)$$

and $$Z = \sum_{j \in N(i)} |t_j|.$$

where $\beta$ is a tuning parameter that may be set in any suitable way.

It should be appreciated that the first term is defined as a difference between $-\log P(c_i(p)=l; \Theta)$ and $\log P_i(l)$. The first term in this difference may be computed based on the mapping calculated in act 316 of process 300. As such the illustrative metric of fit depends on the calculated mapping. In particular, this first term may be obtained as a logarithm of the probability that the annotation l is associated with the p'th image region in the i'th image, given the parameters $\theta$. The parameters $\theta$ may be obtained in any suitable way including, but not limited to, the manner described with respect to act 316.

The second term in the difference (i.e., $\log(P_i(l))$) is a prior on annotations and reflects the frequency of co-occurrence of annotations among images identified as similar in act 308 of process 300. In particular, the first term in this prior may measure the frequency of the l'th annotation among the one or more images identified as similar to the i'th image in act 308 of process 300. The second term reflects the frequency of co-occurrence via the matrix $h^o$, which is an L×L row-normalized annotation co-occurrence matrix that may be calculated from annotation estimates obtained either in act 316 (if this is a first iteration of set of acts 315) or from annotations obtained in a previous iteration of act 318 (if this is not the first iteration of set of acts 315).

The second term in the metric of fit, defined according to:

$$\Phi_s(c_i(p)=l) = -\lambda_s \log h_i^s(p),$$

is a spatial prior and provides an indication as to whether l'th annotation may be assigned the p'th image region in the i'th image based at least in part on a tuning parameter $\lambda_s$, which may be set in any suitable way, and a spatial histogram ($h_i^s(p)$) of the l'th annotation computed by using one or more images in the images identified in act 302 of process 300.

The third term in the metric of fit, defined according to:

$$\Phi_c(c_i(p)=l) = -\lambda_c \log h_{i,l}^c(p)$$

is a color prior and provides an indication as to whether annotation l may be assigned to the p'th image region in the i'th image based at least in part on a tuning parameter which may be set in any suitable way, and a color histogram ($h_{i,l}^c(p)$) of the l'th annotation in the i'th image. The color histogram may be calculated in any of numerous ways and, for example, may be computed for multiple bins for each color channel.

The fourth term in the metric of fit is defined according to:

$$\Psi_{int}(c_i(p)=l_p, c_i(q)=l_q) = -\lambda_o \log h^o(l_p, l_q) + \delta[l_p \neq l_q] \exp(-\lambda_{int}\|I_i(p) - I_i(q)\|)$$

and provides an indication of whether annotations are consistently assigned to pairs of image regions within the i'th image. As such, when annotations are assigned based on the metric of fit, the inclusion of this fourth term may imply that an annotation may be assigned to one image region in an image based on an annotation assigned to another image region in the same image. The parameters $\lambda_o$ and $\lambda_{int}$ are tuning parameters that may be set in any suitable way.

The fifth term in the metric of fit is defined according to $$\Psi_{ext}(c_i(p) = l_p, c_j(r) = l_r) = \delta[l_p \neq l_r] \frac{w_j}{w_i} \exp(-\lambda_{ext}|S_i(p) - S_j(r)|)$$

and provides an indication of whether annotations are consistently assigned to pairs of corresponding image regions identified in act 310 of process 300, where the r'th image region in the j'th image corresponds to the p'th image region in the i'th image, for example, according to:

$$r = p + w_{ij}(p)$$

Intuitively, the fifth term may produce a higher penalty when different annotations are assigned to corresponding image regions. Here the parameter $\lambda_{int}$ is a tuning parameter that may be set in any suitable way.

Accordingly, above-described illustrative the metric of fit depends on the following parameters:

$$\{c, \Theta, \{h_i^s\}_{i=1:L}, \{h_{i,l}^c\}_{i=1:N, l=1:L}, h^o\},$$

which may be estimated in any of numerous ways using any of numerous techniques. For example, any of numerous optimization and/or inference techniques may be used including, but not limited to, coordinate descent, message passing, belief propagation, maximum a posterior estimation, and iteration condition modes.

In addition, the above-described illustrative metric of fit depends on the following parameters $$\{\alpha, \beta, \lambda_s, \lambda_c, \lambda_o, \lambda_{int}, \lambda_{ext}\},$$

which may be set in any numerous ways to control the way in which the above-described terms influence the metric of fit. These values may be any suitable values as this is not a limitation on aspects of the present invention.

After act 318 completes, process 300 proceeds to decision block 320, where it may be determined whether another iteration of acts 316 and 318 may be performed. This determination may be made in any of numerous ways, as the way such a determination may be made is not a limitation of aspects of the present invention. If it is determined that another iteration may be performed, process 300 loops back to act 316, via the YES branch, and acts 316 and 318 are repeated. On the other hand, if it is determined that another iteration may not be performed, process 300 completes.

It should be recognized that process 300 is merely illustrative and that many variations of process 300 are possible. For example, although in the illustrated embodiment all the image-level annotations and, optionally, the human-made annotations are obtained before annotations are assigned to image regions in set of acts 315, in other embodiments additional annotations may be obtained after an assignment of annotations to image regions. This may be advantageous when it may be detected that annotations of certain images may improve the matching between the annotations and the image regions to which they are assigned. As another example, although in the illustrated embodiments the annotations are assigned using an iterative algorithm, in other embodiments annotations may be assigned using any other non-iterative type of approach. As yet another example, though not shown in the illustrative embodiment, the estimate of the annotations obtained after execution of act 318 may be used to improve the way in which similar images are identified in act 310. As such, in some embodiments, process 300 may loop back to act 310, after act 318 completes, and images may be identified as being similar further based on the annotations assigned in act 318. This may be done in any suitable way. For example, images sharing at least a certain number of identical image-region annotations may be identified as similar. Still other variations will be apparent to those of skill in the art.

As previously mentioned, images with comprising one or more annotated image regions (annotated e.g., via process 300 or any of numerous variations of process 300) may be used for various applications including, but not limited to, image search whereby images may be searched based at least in part on the annotations of the image regions. Such searching may be performed in any of numerous ways including, but not limited to, the ways previously described with respect to FIG. 1.

Figure 5:
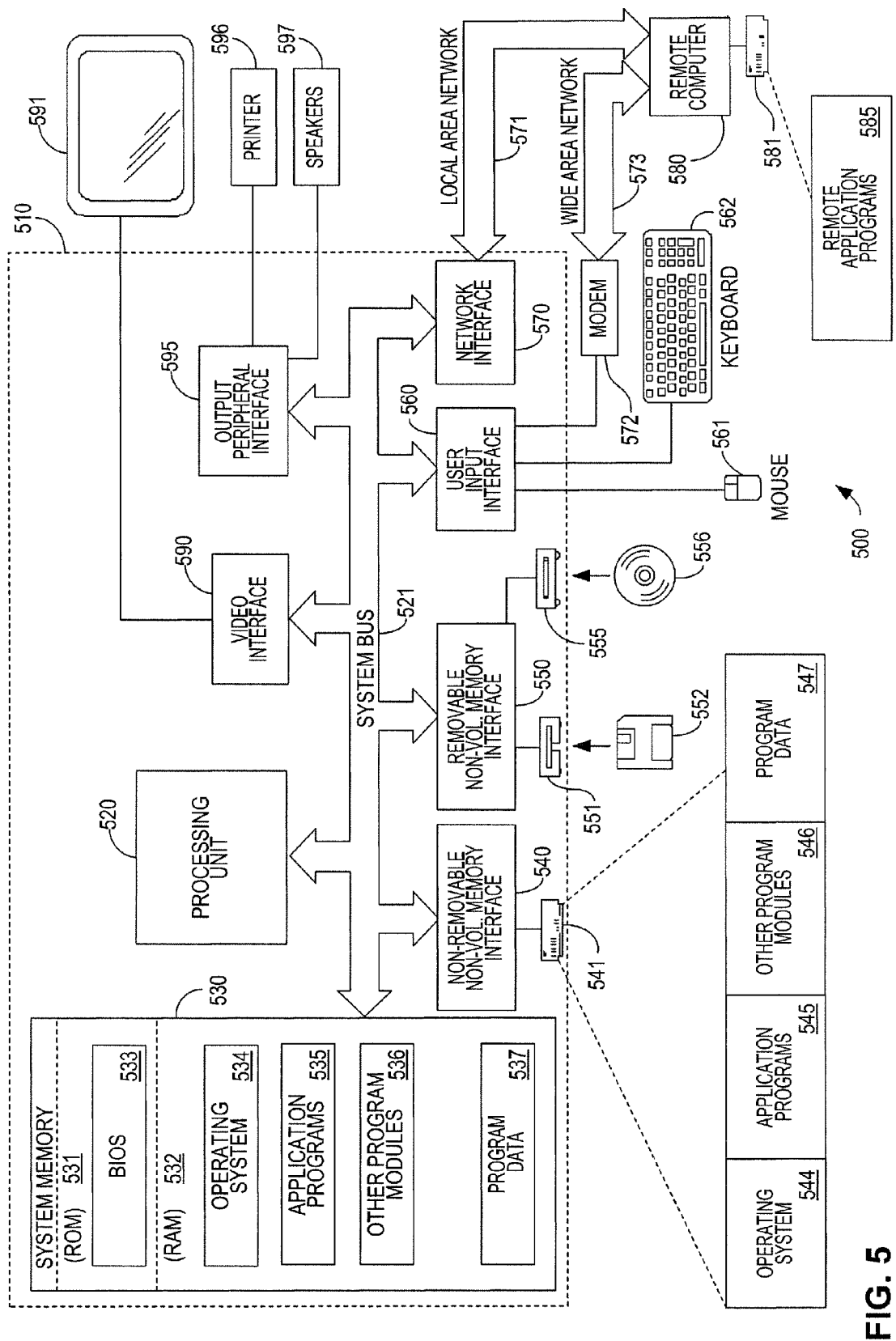
FIG. 5 is a block diagram generally illustrating an example of a computer system that may be used in implementing aspects of the present disclosure.

FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein (e.g., process 300) may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for semantically annotating images in a plurality of images, each image in the plurality of images comprising at least one image region, the method comprising:
   identifying at least two similar images including a first image and a second image;
   identifying corresponding image regions in the first image and the second image; and
   iteratively assigning, using at least one processor, annotations to image regions in one or more images in the plurality of images by using a metric of fit indicative of a degree of match between the assigned annotations and the corresponding image regions,
   the metric of fit depending on at least one annotation for each image in a subset of the plurality of images and the identified correspondence between image regions in the first image and the second image, the metric of fit computed using one or more spatial histograms of the at least one annotation for the each image.

2. The method of claim 1, wherein:
   identifying corresponding image regions comprises identifying a first image region in the first image with a second image region in the second image; and
   assigning the annotations to the image regions comprises iteratively assigning annotations to image regions based on the metric of fit,
   wherein each iteration comprises assigning an annotation to the first image region based at least in part on an annotation assigned to the second image region.

3. The method of claim 2, wherein the first image comprises a third image region neighboring the first image region and wherein each iteration comprises:
   assigning the annotation to the first image region further based on an annotation assigned to the third image region.

4. The method of claim 2, wherein each iteration comprises:
   assigning the annotation to the first image region further based on the one or more spatial histograms of the annotation, wherein each of the one or more spatial histograms of the annotation is computed across multiple images in the plurality of images.

5. The method of claim 1, further comprising:
   automatically obtaining the at least one annotation at least in part by obtaining at least one image-level annotation for an image in the subset of the plurality of images from text near the image in a document and/or webpage containing the image.

6. The method of claim 1, further comprising obtaining the at least one annotation by:
   providing at least one image in the subset of the plurality of images to a user; and
   obtaining, from the user, at least one image-region annotation for the at least one image.

7. The method of claim 1, wherein identifying the at least two similar images comprises:
   computing a measure of similarity indicative of a degree of similarity between images for a pair of images;
   identifying the pair of images as similar if the computed measure of similarity is greater than a predetermined threshold.

8. The method of claim 1, wherein identifying corresponding image regions in the first image and the second image comprises:

calculating a correspondence between image regions in the first image and image regions in the second image based on an objective function indicative of a degree of similarity between the image regions.

9. The method of claim 1, wherein the first image region is a pixel.

10. A system for enabling text-based search for images in a plurality of images based at least in part on image-level annotations associated with the images, the system comprising:
 at least one processor configured to:
  identify at least two similar images including a first image and a second image;
  identify corresponding image regions in the first image and the second image; and
  iteratively assign annotations to image regions in one or more images in the plurality of images by using a metric of fit indicative of a degree of match between the assigned annotations and the corresponding image regions,
  the metric of fit depending on at least one annotation for each image in a subset of the plurality of images and the identified correspondence between image regions in the first image and the second image, the metric of fit computed using one or more spatial histograms of the at least one annotation for the each image.

11. The system of claim 10, wherein the at least one processor is configured to:
 identify corresponding image regions by identifying a first image region in the first image with a second image region in the second image; and
 assign the annotations to the image regions by iteratively assigning annotations to image regions based on the metric of fit,
 wherein each iteration comprises assigning an annotation to the first image region based at least in part on an annotation assigned to the second image region.

12. The system of claim 11, wherein each iteration comprises calculating a statistical mapping between annotations and the image regions in the one or more images in the plurality of images.

13. The system of claim 12, wherein calculating the statistical mapping comprises estimating at least one parameter of a mixture model, wherein the mixture model comprises an element for each annotation in a set of annotations.

14. The system of claim 10, wherein the subset of the plurality of images comprises ten percent or less of the plurality of the images.

15. At least one tangible computer-readable storage medium storing processor-executable instructions that, when executed by at least one processor, perform a method for semantically annotating images in a plurality of images, each image in the plurality of images comprising one or more pixels, the method comprising:
 obtaining at least one image-level annotation for each image in a subset of the plurality of images;
 identifying at least two similar images including a first image and a second image;
 identifying corresponding pixels in the first image and the second image; and
 iteratively assigning annotations to pixels in one or more images in the plurality of images by using a metric of fit indicative of a degree of match between the assigned annotations and the corresponding pixels,
 the metric of fit depending on at least one obtained image-level annotation and the identified correspondence between pixels in the first image and the second image, the metric of fit computed using one or more spatial histograms of the at least one annotation for the each image.

16. The at least one tangible computer-readable storage medium of claim 15, wherein
 identifying corresponding pixels comprises identifying a first pixel in the first image with a second pixel in the second image; and
 assigning the annotations to the pixels comprises iteratively assigning annotations to the pixels based on the metric of fit,
 wherein each iteration comprises assigning an annotation to the first pixel based at least in part on an annotation assigned to the second pixel.

17. The at least one tangible computer-readable storage medium of claim 16, wherein the first image comprises a third pixel near the first pixel and wherein each iteration comprises:
 assigning the annotation to the first pixel further based on an annotation assigned to the third pixel.

18. The at least one tangible computer-readable storage medium of claim 16, wherein each iteration comprises calculating a statistical mapping between annotations and the image regions in the one or more images in the plurality of images.

19. The at least one tangible computer-readable storage medium of claim 15, further comprising:
 automatically obtaining the at least one image-level annotation for an image in a webpage from text near the image on the webpage.

20. The at least one tangible computer-readable storage medium of claim 15, wherein obtaining the at least one image-level annotation includes:
 providing at least one image in the subset of the plurality of images to a user; and
 obtaining, from the user, at least one image-region annotation for the at least one image.

* * * * *